(12) United States Patent
Hwang et al.

(10) Patent No.: US 7,305,048 B2
(45) Date of Patent: Dec. 4, 2007

(54) BURST MODE RECEIVER AND METHOD FOR STABLE RECEPTION OF PACKET DATA ON TELEPHONE LINE

(75) Inventors: Sung-hyun Hwang, Suwon (KR);
Hyun-cheol Park, Yongin (KR);
Oh-sang Kwon, Suwon (KR);
Chang-hyun Yim, Suwon (KR);
Jae-woo Kim, Kyungki-do (KR);
Jung-hoon Kim, Seoul (KR)

(73) Assignee: Samsung Electronics Co., Ltd. (KR)

( * ) Notice: Subject to any disclaimer, the term of this patent is extended or adjusted under 35 U.S.C. 154(b) by 992 days.

(21) Appl. No.: 10/427,371

(22) Filed: May 1, 2003

(65) Prior Publication Data

US 2003/0223434 A1    Dec. 4, 2003

(30) Foreign Application Priority Data

Jun. 1, 2002   (KR)   ............................... 2002-30910

(51) Int. Cl.
*H04L 27/06*   (2006.01)
(52) U.S. Cl. ...................................................... 375/316
(58) Field of Classification Search ................ 375/316, 375/354, 229, 230, 345, 233; 370/347, 343; 379/414, 416; 455/426, 413
See application file for complete search history.

(56) References Cited

U.S. PATENT DOCUMENTS

| 6,144,853 A * | 11/2000 | Gentles et al. ............ 455/553.1 |
| 7,167,509 B2 * | 1/2007 | Hasegawa et al. .......... 375/219 |
| 2002/0154620 A1 * | 10/2002 | Azenkot et al. ............ 370/347 |

* cited by examiner

*Primary Examiner*—Khai Tran
(74) *Attorney, Agent, or Firm*—Mills & Onello LLP

(57) ABSTRACT

A receiver performing a stable operation in a burst mode is provided. The receiver transmits packet data using a preamble, and has good acquisition performance so that a synchronization part converges on a preamble interval. For the acquisition performance, the receiver senses the carrier of a received signal, detects a rough location of a burst, and in response to the result of carrier sensing, performs coarse gain control, symbol timing compensation, and frame synchronization. Then, if the frame synchronization is completed, in response to the result of frame synchronization, the receiver performs fine gain control, equalization of the signal, and carrier recovery.

42 Claims, 6 Drawing Sheets

BURST MODE RECEIVER AND METHOD FOR STABLE RECEPTION OF PACKET DATA ON TELEPHONE LINE

BACKGROUND OF THE INVENTION

1. Field of the Invention

The present invention relates to a packet data receiver, and more particularly, to a burst mode receiver for implementing a home networking system using telephone lines installed in a deck.

2. Description of the Related Art

Today's data networks use digital signal processing (DSP) devices, including modems, to transmit data through communications channels. In general, data is transmitted using an analog transmission signal described as a bit stream. These communications channels are appropriate for transmission of real-time information such as voice or video. Recently, packet-based information transmission using modems has been widely used.

Burst mode transmitters for transmitting packet-based information transmit a training sequence or a preamble before transmitting data so that a burst mode receiver receives a correct clock sample phase and a correct carrier phase for data recovery.

FIG. 1 is a schematic diagram showing the structure of a packet transmitted by a transmitter complying with a burst mode protocol. Referring to FIG. 1, the packet 10 can be transmitted by a transmission circuit installed in one or more modems. Each packet 10 comprises a preamble (P) 12, a header (H) 13, and payload data (D) 14.

The header 13 includes information items that identify the nature of the packet 10, for example, the version or type of the preamble, packet source or destination address, a data rate, error control parameter, and the packet length. These information items plays a role guaranteeing that information receiving systems correctly interpret the start of information transfer.

A burst mode receiver should sense the information items included in the header 13, and complete acquisition in a short preamble interval. Therefore, it is important for a burst mode receiver to have a good acquisition performance.

An essential technology which directly determines this performance of a burst mode receiver is a synchronization unit algorithm. However, only under a condition that stable frame synchronization is performed in a burst mode receiver using a preamble structure, the performance of the synchronization unit algorithm can be guaranteed.

Accordingly, in order to guarantee the stable performance of a burst mode receiver, frame synchronization for accurately detecting a burst arrival time is a prerequisite.

SUMMARY OF THE INVENTION

To solve the above problems, it is an objective of the present invention to provide a burst mode receiver which can stably receive packet data on a telephone line by detecting an accurate burst arrival time in order to guarantee stable performance of a data-aided method, and a method therefor.

According to an aspect of the present invention, there is provided a burst mode receiver including a filtering unit, a carrier sensing unit, a symbol timing recovery unit, a frame synchronizer, a gain control unit, an equalization unit, and a carrier recovery unit. The filtering unit filters a signal input through a telephone line. The carrier sensing unit detects a carrier wave from the filtered signal, and roughly detects the location of a burst. The symbol timing recovery unit finely recovers symbol timing of the signal in response to the carrier sensing result. The frame synchronizer performs frame synchronization of the signal in response to the carrier sensing result. The gain control unit performs a first gain control in response to the carrier sensing result and performs a second gain control in response to the result of the frame synchronization. The equalization unit equalizes the signal in response to the result of the frame synchronization. The carrier recovery unit recovers the carrier wave of the signal in response to the result of the frame synchronization.

The gain control unit includes a first gain controller which, in response to the carrier sensing result, adjusts the gain of the variable gain amplifier, and a second gain controller which, in response to the frame synchronization result, adjusts a gain by which the result of the symbol timing recovery will be multiplied.

The first gain controller is formed as a feedback type, and the second gain controller is formed as a feedforward type. Each of the first and second gain controllers calculates the gain of the variable gain amplifier from a signal which is input for a predetermined interval before the frame synchronization, and after the end of the interval the calculated gain is continuously maintained.

According to another aspect of the present invention, there is provided a burst mode receiver including a filtering unit, a variable gain amplifier, an A/D converter, a carrier sensing/symbol timing recovery unit, a first gain controller, a frame synchronizer, a second gain controller, an equalization unit, and a carrier recovery unit.

The filtering unit receives an analog signal input through a telephone line and filters the signal. The variable gain amplifier amplifies the input signal in a predetermined ratio. The A/D converter converts the amplified signal into a digital signal. The carrier sensing/symbol timing recovery unit detects a carrier wave from the filtered signal, and in response to the carrier detection result recovers symbol timing. The first gain controller adjusts the gain of the variable gain amplifier in response to the carrier sensing result. The frame synchronizer performs frame synchronization in response to the carrier sensing result. If the frame synchronization is completed, the second gain controller adjusts a gain, by which the symbol timing recovery result will be multiplied, in response to the frame synchronization result. In response to the frame synchronization result, the equalization unit equalizes a signal obtained by multiplying the symbol timing recovery result by the gain. In response to the frame synchronization result, the carrier recovery unit recovers a carrier wave from the equalized signal.

The filtering unit includes a band-pass filter, an echo canceller, an adder, a notch filter, a multiplier, and a low pass filter. The band-pass filter receives the analog signal, and provides a signal included in a predetermined frequency band to the variable gain amplifier. The echo canceller generates an echo duplication signal. The adder subtracts the echo duplication signal from a digital output signal of the variable gain amplifier which is input through the A/D converter, and provides the subtraction result to the first gain control unit. In response to the subtraction result of the adder, the notch filter cuts off a signal included in a narrow band frequency region. The multiplier multiplies the output signal of the notch filter by a predetermined carrier frequency. The low pass filter smoothes the output signal of the multiplier, and outputs the smoothed signal to the carrier sensing/symbol timing recovery unit.

According to another aspect of the present invention, there is provided a burst mode receiver including a filtering unit, a variable gain amplifier, an A/D converter, a carrier detection/gain control unit, a symbol timing recovery unit, a frame synchronizer, a gain control unit, an equalization unit, and a carrier recovery unit.

The filtering unit receives an analog signal input through a telephone line and filters the signal. The variable gain amplifier amplifies the input signal in a predetermined ratio. The A/D converter converts the amplified signal into a digital signal. The carrier detection/gain control unit detects a carrier wave from the filter signal, and in response to the carrier detection result controls the gain of the variable gain amplifier. The symbol timing recovery unit recovers the symbol timing of the filtered signal in response to the carrier detection result. In response to the carrier sensing result, the frame synchronizer performs frame synchronization. If the frame synchronization is completed, the gain control unit adjusts a gain, by which the symbol timing recovery result will be multiplied, in response to the frame synchronization result. In response to the frame synchronization result, the equalization unit equalizes a signal obtained by multiplying the symbol timing recovery result by the gain. In response to the frame synchronization result, the carrier recovery unit recovers a carrier wave from the equalized signal.

In one embodiment, the filtering unit includes a band-pass filter, a notch filter, an echo canceller, an adder, a multiplier, and a low pass filter. The band-pass filter receives the analog signal, and outputs a signal included in a predetermined frequency band. The notch filter cuts off a signal included in a narrow-scope frequency region in the band-pass filtered signal, and outputs the result to the variable gain amplifier. The echo canceller generates an echo duplication signal. The adder subtracts the echo duplication signal from a digital output signal of the variable gain amplifier, which is input through the A/D converter, and provides the subtraction result to the carrier detection/gain control unit. The multiplier multiplies the subtraction result of the adder by a predetermined carrier frequency. The low pass filter smoothes the output signal of the multiplier, and outputs the smoothed signal to the symbol timing recovery unit.

The filtering unit may include a band-pass filter, an echo canceller, an adder, a notch filter, a multiplier, a switching unit, and a low pass filter. The band-pass filter receives the analog signal, and outputs a signal included in a predetermined frequency band to the variable gain amplifier. The echo canceller generates an echo duplication signal. The adder subtracts the echo duplication signal from a digital output signal of the variable gain amplifier, which is input through the A/D converter, and provides the subtraction result to the carrier detection/gain control unit. In response to the subtraction result of the adder, the notch filter cuts off a signal included in a narrow-scope frequency region. The multiplier multiplies the output signal of the notch filter by a predetermined carrier frequency. The switching unit is connected to the input/output terminal of the notch filter and the carrier detection/gain control unit, and before the carrier detection/gain control unit completes carrier detection, provides the output signal of the notch filter to the carrier detection/gain control unit, and after the carrier detection/gain control unit completes carrier detection, provides the input signal of the notch filter to the carrier detection/gain control unit. The low pass filter smoothes the output signal of the multiplier, and outputs the smoothed signal to carrier detection/symbol timing recovery unit.

According to another aspect of the present invention, there is provided a burst mode receiving method including receiving a signal from a transmitter complying with a burst mode protocol; sensing the carrier of the signal and detecting a rough location of a burst; in response to the carrier sensing result, performing coarse gain control, symbol timing recovery, and frame synchronization; and if the frame synchronization is completed, in response to the frame synchronization, performing fine gain control, equalization of the signal, and carrier recovery.

BRIEF DESCRIPTION OF THE DRAWINGS

The foregoing and other objects, features and advantages of the invention will be apparent from the more particular description of a preferred embodiment of the invention, as illustrated in the accompanying drawings in which like reference characters refer to the same parts throughout the different views. The drawings are not necessarily to scale, emphasis instead being placed upon illustrating the principles of the invention.

DESCRIPTION OF THE PREFERRED EMBODIMENTS

Figure 1:
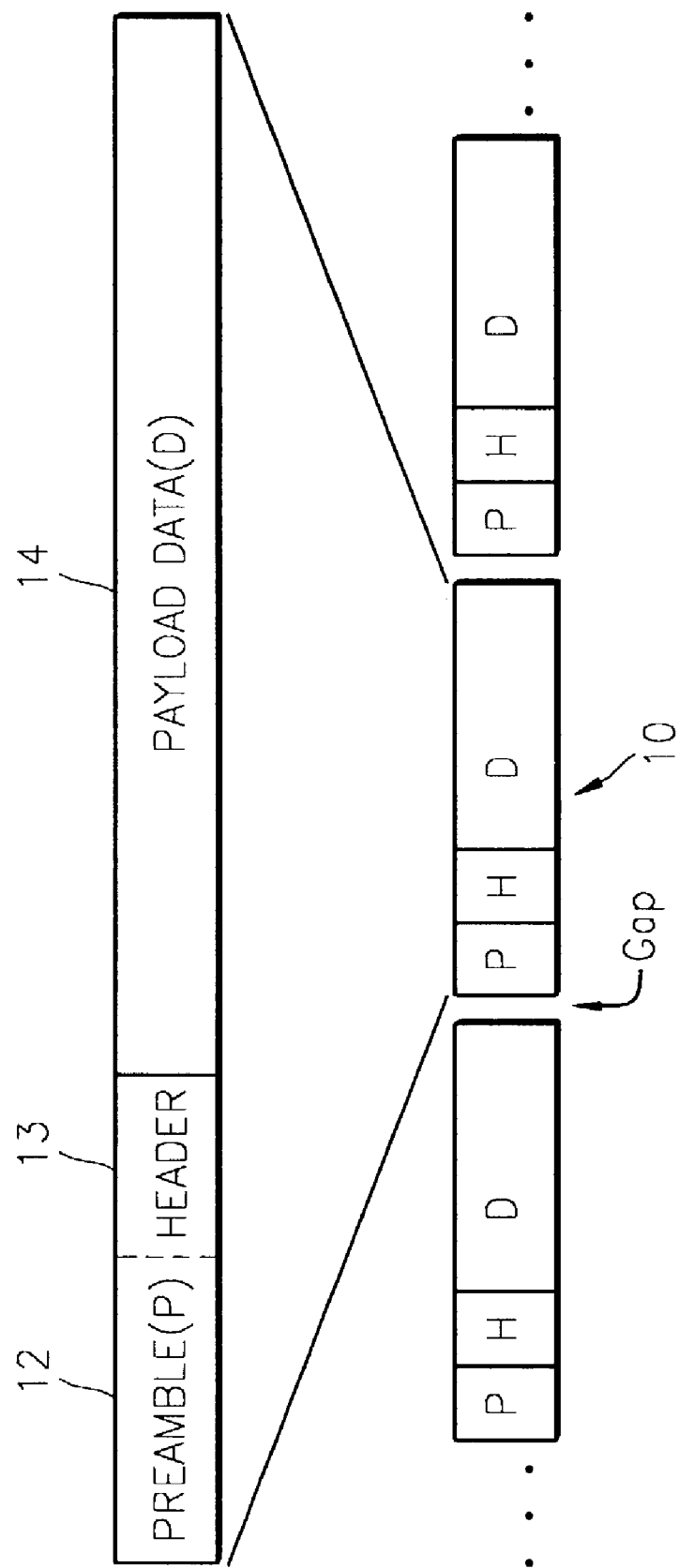
FIG. 1 is a schematic diagram showing the structure of a packet transmitted by a transmitter complying with a burst mode protocol.
Figure 2:
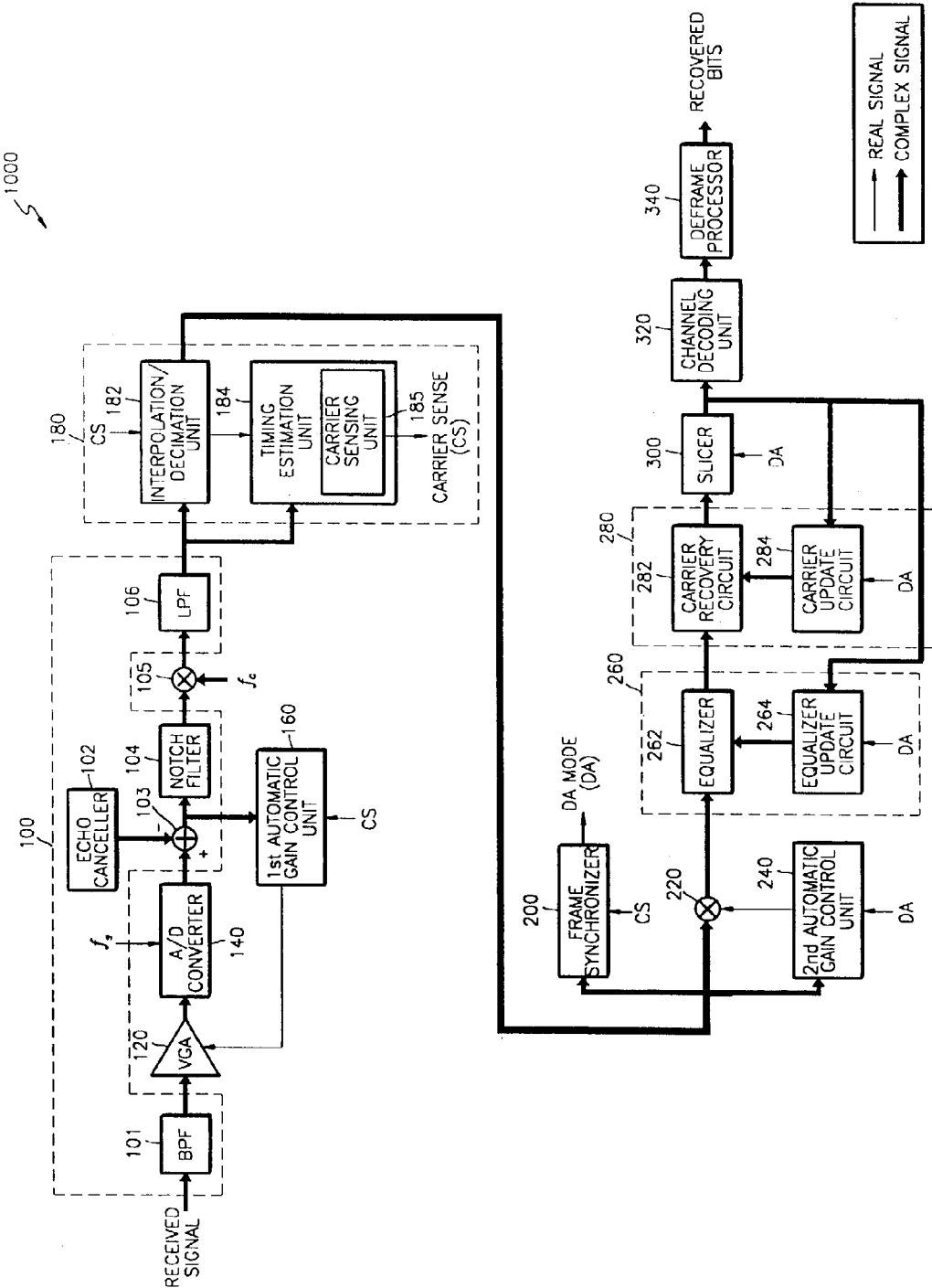
FIG. 2 is a block diagram of a burst mode receiver according to a first preferred embodiment of the present invention.

FIG. 2 is a block diagram of a burst mode receiver 1000 according to a first preferred embodiment of the present invention. The burst mode receiver 1000 should complete acquisition in a short preamble interval.

Therefore, for good acquisition performance, the bust mode receiver 1000 adopts a synchronization unit algorithm formed based on feedforward-type block demodulation. The synchronization unit algorithm is designed as a data-aided type in order to effectively utilize a preamble inserted into the start part of a frame.

Referring to FIG. 2, the burst mode receiver 1000 comprises a filtering unit 100, a multiplier 105, a variable gain amplifier (VGA) 120, an analog-to-digital (A/D) converter 140, a first automatic gain control unit 160, a symbol timing recovery unit (STR) 180, a carrier sensing unit 185, a frame synchronizer 200, a second automatic gain control unit 240, an equalization unit 260, a carrier recovery unit 280, a slicer 300, a channel decoding unit 320, and a deframe processor 340.

The filtering unit 100 comprises a band-pass filter (BPF) 101, an echo canceller 102, an adder 103, a notch filter 104, and a low pass filter (LPF) 106.

The band-pass filter 101 receives an analog signal (received signal) output from a telephone station through a telephone line, filters the signal, and outputs the filtered signal. The signal filtered by the band-pass filter 101 is output to the variable gain amplifier (VGA) 120 and amplified. The A/D converter 140 receives an analog-type signal output from the variable gain amplifier 120, samples the signal, and converts the sampled signal into a digital signal.

The echo canceller 102 generates an echo duplication signal, and outputs the echo duplication signal to the adder 103. The adder 103 subtracts the output signal of the echo canceller 102 from the output signal of the A/D converter 140. Accordingly, the adder 103 outputs a clean and clear signal in which the echo is removed.

The first automatic gain control unit 160 receives the output signal of the adder 103, and using the signal, adjusts the gain of the variable gain amplifier 120 to optimize the performance of the A/D converter 140.

The first automatic gain control unit 160 has a backward-type structure. The first automatic gain control unit 160 receives a signal which is input during a predetermined window interval, and calculates the gain of the variable gain amplifier 120. The gain calculated in the first automatic gain control unit 160 is continuously maintained after the end of the window interval.

The notch filter 104 receives the output signal of the adder 103, notch filters the signal, and outputs the result. The multiplier 105 multiplies the output signal of the notch filter 104 by a predetermined carrier frequency (fc). The low pass filter 106 receives the output signal of the multiplier 105 and smoothes the signal.

The STR 180 comprises an interpolation/decimation unit 182, and a timing estimation unit 184. Since the carrier sensing unit 185 is shared by the timing estimation unit 184, the timing estimation unit 184 performs both a symbol timing estimation function and a carrier sensing function. The STR 180 is formed in a feedforward type appropriate for a burst mode receiver.

The STR 180 senses a carrier wave through the carrier sensing unit 185 and at the same time extracts timing information of a symbol through the timing estimation unit 184.

The carrier sensing unit 185 is formed separately from the frame synchronizer 200. For time slot control of a medium access control (MAC) layer, the carrier sensing unit 185 roughly detects the start time of a burst before all synchronization units 180, 200, etc, detect the start time.

The carrier sensing unit 185, which will be described in detail below, shares a part of the STR 180 or a part of the first automatic gain control unit 160 according to the installation location of the notch filter 104 such that the carrier sensing unit 185 is easily implemented without giving a heavy burden in hardware.

If the carrier sensing result (CS) of the carrier sensing unit 185 can indicate a correct burst location without one symbol error, the carrier sensing unit 185 can perform even a frame synchronization function.

However, since there is an error caused by a channel environment in an ordinary receiver, the burst mode receiver 1000 according to the present invention has a separate carrier sensing function and frame synchronization function in order to detect a correct burst.

If timing information of a symbol and a burst start time are roughly detected by the timing estimation unit 182 and the carrier sensing unit 185, the interpolation/decimation unit 182 of the STR compensates for a timing offset in response to the carrier sensing result (CS) and the output signal of the low pass filter 106.

The output of the interpolation/decimation unit 182 is provided to the frame synchronizer 200, the multiplier 220, and the second automatic gain control unit 240. In response to the output signal of the interpolation/decimation unit 182 and the carrier sensing result (CS), the frame synchronizer 200 performs frame synchronization and generates a data-aided (DA) mode signal.

The second automatic gain control unit 240 receives the output signal of the STR 180, and the result of the frame synchronization, that is, a DA signal, and appropriately compensates for amplitude distortion of a multi-level quadrature amplitude modulation signal.

The second automatic gain control unit 240 has a feed-forward-type structure, and calculates a gain to be output to the multiplier 220. As in the first automatic control unit 160, the gain calculated by the second automatic gain control unit 240 is continuously maintained after the end of a predetermined window interval.

In the receiver 1000 according to the present invention, gain control is performed in two steps through the first automatic gain control unit 160 and the second automatic gain control unit 240. The first automatic gain control unit 160 performs a coarse gain control before frame synchronization, and the second automatic gain control unit 240 performs a fine gain control after frame synchronization. By doing so, the performance of the receiver 1000 improves.

The equalization unit 260 comprises an equalizer 262, and an equalizer update circuit 264. The equalizer 262 compensates for linear distortions caused by communications channels (for example, a telephone line), and is designed as a data-aided type in order to utilize a preamble.

The equalizer 262 is implemented by a decision feedback equalizer, a kind of a non-linear equalizer which shows good performance even under a deteriorated channel environment. The equalizer update circuit 264, which will be described below, in response to the output signal of the slicer 300, updates variables used in the equalizer 262.

The carrier recovery unit 280 comprises a carrier recovery circuit 282 and a carrier update circuit 284. The carrier recovery circuit 282 is also designed as a data-aided type in order to utilize a preamble.

The carrier recovery circuit 282 receives the output signal of the equalizer 262, extracts a carrier signal from the received signal, and outputs not processed symbols to the slicer 300. The carrier update circuit 284, in response to a signal output from the slicer 300 and the frame synchronization result (the DA signal), updates variables used in carrier recovery.

In a telephone line channel to which the burst mode receiver 1000 is connected, the affect of additive white Gaussian noise (AWGN) is insignificant, while the affect of inter-symbol interface (ISI) caused by a variety multi-paths is great.

Since the probability that a frequency offset occurs in this telephone line channel is very low, it can be said that clock instability occurring in the oscillator of a transmitting and receiving terminal is all of the frequency offset.

Accordingly, the carrier recovery circuit 282 does not have a frequency offset compensation circuit such as an automatic frequency control (AFC), and has only a feedback carrier phase recovery circuit in which a phase synchronization algorithm is formed in a backward structure.

The reason why the phase synchronization algorithm is formed in a backward structure is that it is important to maintain the initial synchronization, which is acquired in the preamble, in the payload region, too.

For improvement of the performance of the burst mode receiver 1000 of the present invention, it is preferable that the equalizer 262 operates, having a time difference from the operation of the carrier recovery circuit 282. It is because if the equalizer 262 and the carrier recovery circuit 282 simultaneously operate, the carrier synchronization process may interfere with the operation of the equalizer 262.

Accordingly, in the present invention, the equalizer 262 first operates so as to reduce interference between symbols by a channel, and then the carrier recovery circuit 282 operates so that stable and faster synchronization is achieved.

In order to operate the carrier recovery circuit 282 and the equalizer 262 in a data-aided method, frame synchronization capable of detecting a correct burst arrival time is a prerequisite. For this, the frame synchronizer 200 according to the present invention maximizes its performance, by employing a structure using correlation between a received signal and a preamble pattern.

The slicer 300 receives the result of frame synchronization (DA signal), and generates a hard symbol decision signal for a received signal (or symbol), by cutting off the signal level which is greater or less than a predetermined level if the level of a signal output from the carrier recovery circuit 282 changes or distortion occurs in the signal. By doing so, the slicer 300 plays the role of a hard limiter.

The output of the slicer 300 is provided to the channel decoding unit 320, the equalizer update circuit 264, and the carrier update circuit 284.

The equalizer update circuit 264 and the carrier update circuit 284 receives the signal (or symbol) output from the slicer 300, and determines a quantizer error.

In response to the determined quantizer error, the equalizer update circuit 264 and the carrier update circuit 284 updates coefficients used in the equalizer 262 and coefficients used in the carrier recovery circuit 282, respectively. As a result, the accuracy of hard symbol decision is made after this process improves.

Meanwhile, in response to the signal output from the slicer 300, the channel decoding unit 320 performs a channel decoding operation. The channel decoding unit 320 compensates for quantizer errors, using redundant information in the received signal. For this, the channel decoding unit 320 has circuits, such as a Viterbi decoder, and a maximum likelihood sequence estimator.

The deframe processor 340 receives a bit stream decoded in the channel decoding unit 320, decodes the bit stream into packet data, and loads the decoded data packet to a packet queue (not shown).

Figure 3:
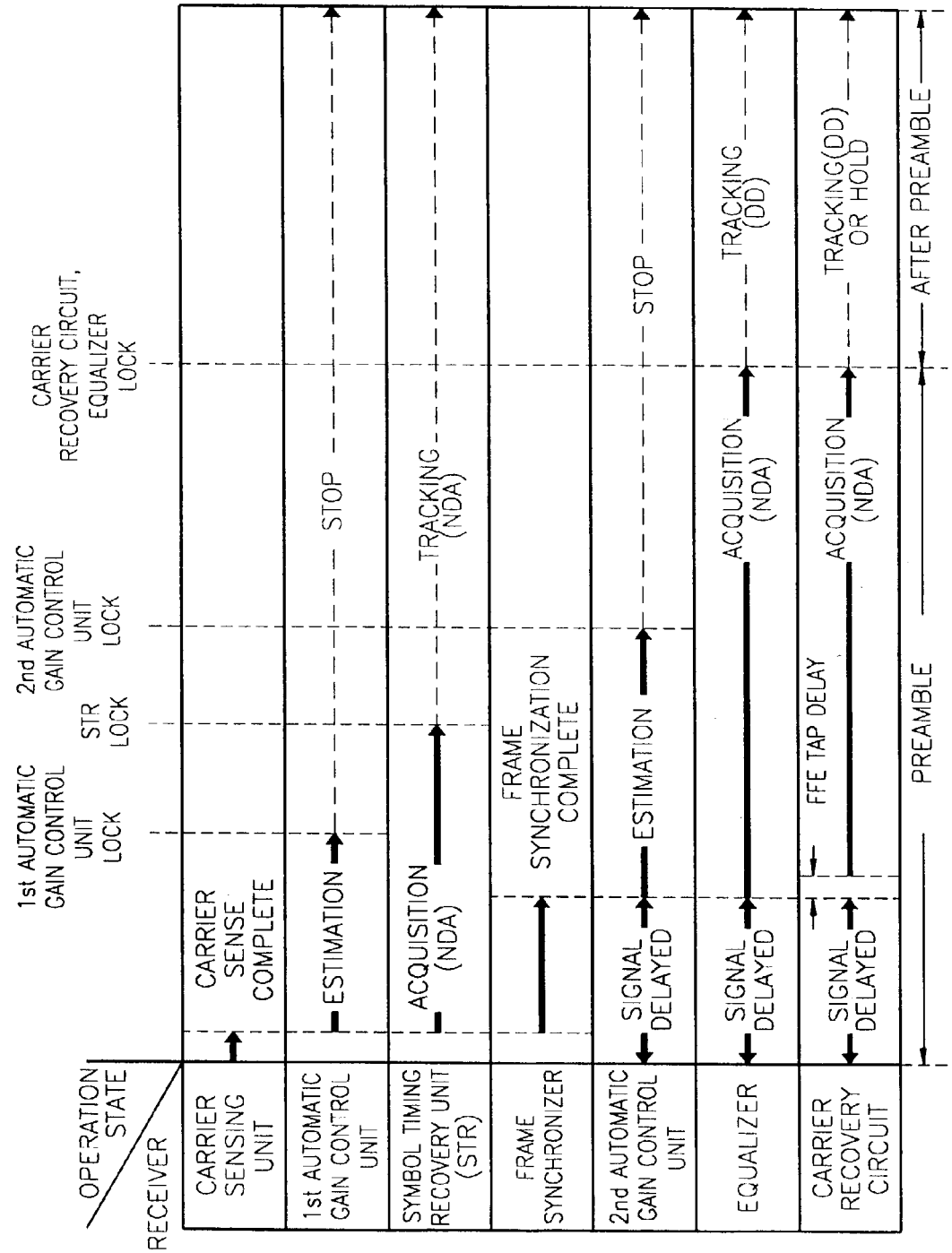
FIG. 3 is a timing diagram showing the operation timing of the burst mode receiver shown in FIG. 2.

FIG. 3 is a timing diagram showing the operation timing of the burst mode receiver shown in FIG. 2. Referring to FIGS. 2 and 3, first, if a carrier wave is sensed by the carrier sensing unit 185, the sensing result (CS) is output to the first automatic gain control unit 160, the STR 180, and the frame synchronizer 200.

The first automatic gain control unit 160, in response to the carrier sensing result (CS), begins to estimate the gain of the variable gain amplifier 120. The first automatic gain control unit 160 estimates the gain for a predetermined window interval, and if the estimation of the gain is completed, enters into a lock state such that the estimated gain is continuously maintained.

The STR 180 and the frame synchronizer 200, in response to the carrier sensing result (CS), begin to perform timing estimation and frame synchronization. To the STR 180 and the frame synchronizer 200, an algorithm which is scarcely affected by a gain change is applied. Accordingly, the STR 180 and the frame synchronizer 200 independently perform symbol synchronization and frame synchronization, respectively, without being affected by the gain change estimated in the first automatic gain control unit 160.

Then, if the frame synchronization is completed after a predetermined signal delay, the second automatic gain control unit 240, the equalizer 262, and the carrier recovery circuit 282 begin to operate.

The second automatic gain control unit 240, in response to the result of the frame synchronization (DA signal), adjusts a fine gain. The second automatic gain control unit 240 estimates a gain for a predetermined window interval, and if the gain estimation is completed, enters into a lock state such the estimated gain is continuously maintained.

The equalizer 262 and the carrier recovery circuit 282, in response to the frame synchronization result (DA signal), begin to acquire a data-aided (DA)-type signal. Then, after a preamble interval, tracking in a decision directed (DD) method begins.

Here, the equalizer 262 and the carrier recovery circuit 282 may operate simultaneously. Also, in another embodiment, the equalizer 262 may operate first to reduce the interference between symbols and then the carrier recovery circuit 282 may operate.

As described above, all the first automatic gain control unit 160, the STR 180, the frame synchronizer 200, the second automatic gain control unit 240, the equalizer 262, and the carrier recovery circuit 282 complete initial synchronization within a preamble interval, and enter into a normal mode in an interval after the preamble.

Accordingly, since the synchronization unit 160, 180, 200, 240, 262, and 282 of the burst mode receiver 1000 according to the present invention converge on a short preamble interval, the burst mode receiver 1000 has a good acquisition function.

Also, since the carrier sensing operation and the frame synchronization operation are concurrently performed, the burst mode receiver 1000 according to the present invention can accurately detect a burst. As a result, frame synchronization can be stably performed, and the performance of a carrier recovery algorithm is solidly guaranteed.

Figure 4:
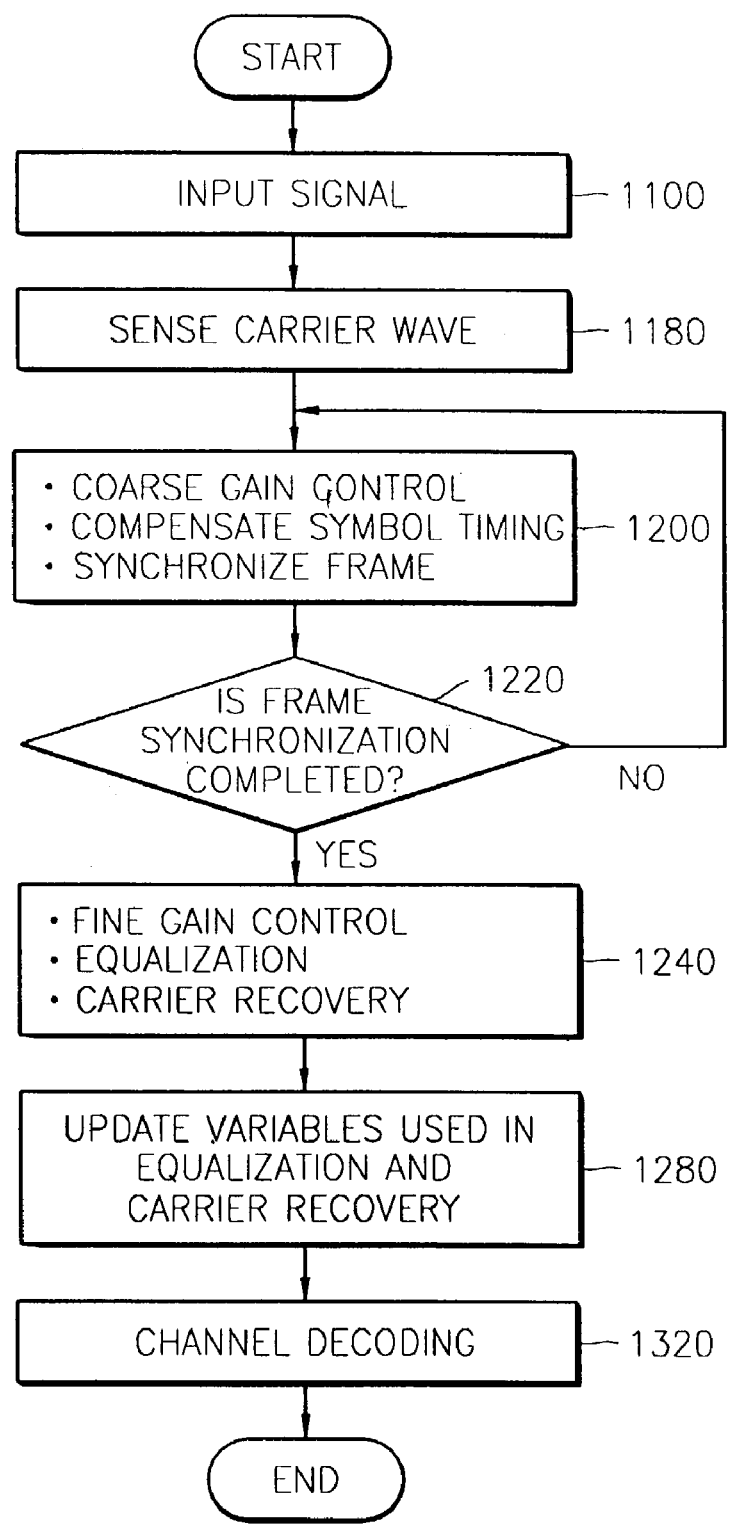
FIG. 4 is a flowchart of the operational sequence of a burst mode receiver according to a preferred embodiment of the present invention.

FIG. 4 is a flowchart of the operational sequence of a burst mode receiver according to a preferred embodiment of the present invention. Referring to FIGS. 2 and 4, the filtering unit 100 of the burst mode receiver 1000 according to the present invention receives an input signal, and outputs the result of the operations of respective circuits in step 1100.

The carrier sensing unit 185 senses an input carrier wave, and detects a rough location of a burst in step 1180. Here, the carrier wave is a signal transmitted by one or more transmitters complying with a burst mode protocol.

If the carrier sensing unit 185 senses a carrier wave, coarse gain control, symbol timing compensation, and frame synchronization are performed in response to the carrier sensing result (CS) in step 1200. Then, it is determined whether or not the frame synchronization is completed in step 1220. If the frame synchronization is completed, fine gain control, equalization, and carrier recovery operations are performed in step 1240.

Here, the equalization and carrier recovery operations may be performed simultaneously, or, the equalization may be performed first to reduce interference between symbols, and then the carrier recovery operation may be performed. If the carrier recovery is completed, variables used in the equalization and the carrier recovery are updated in step 1280, and channel decoding is performed in step 1320.

Figure 5:
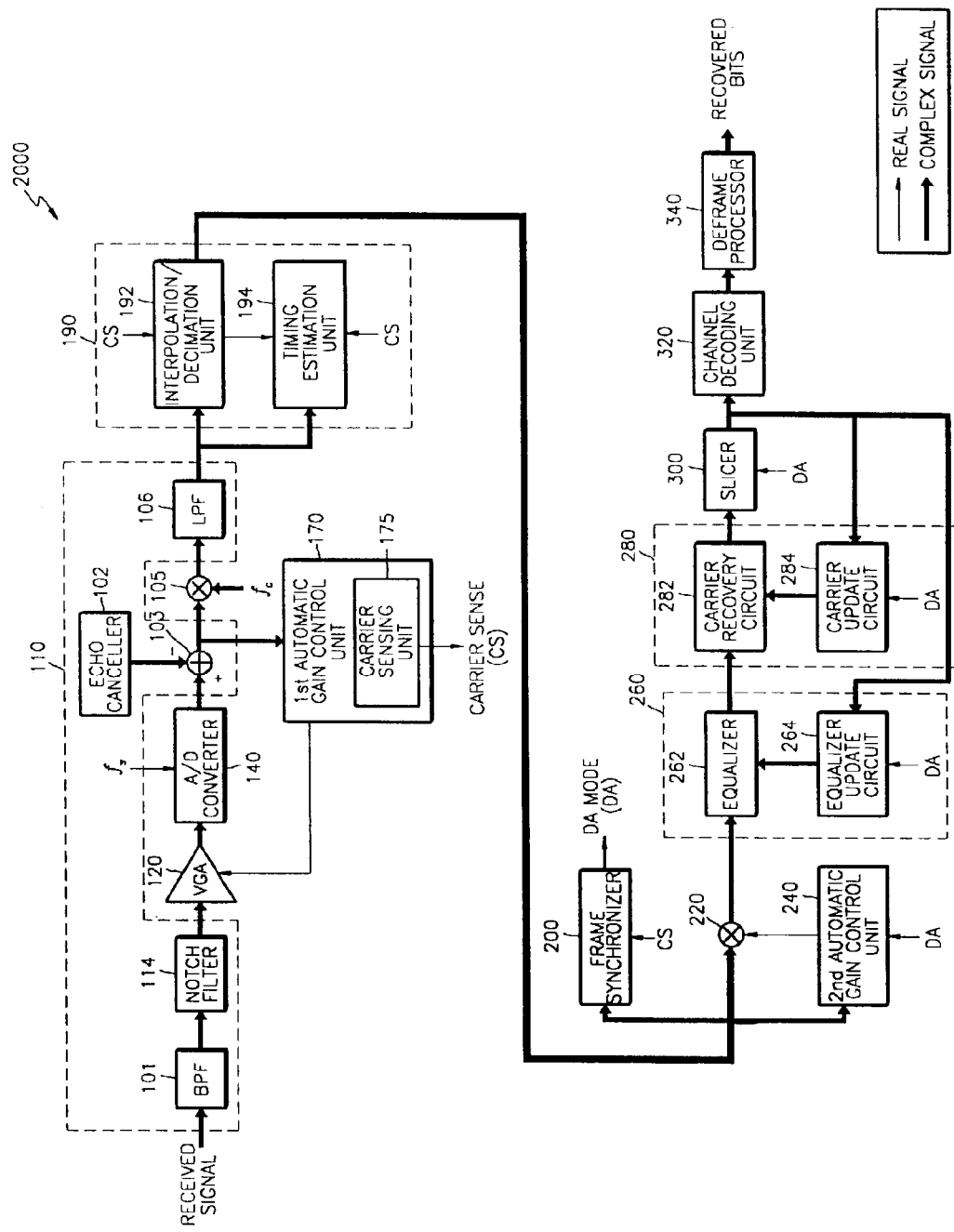
FIG. 5 is a block diagram of a burst mode receiver according to a second preferred embodiment of the present invention.

FIG. 5 is a block diagram of a burst mode receiver 2000 according to a second preferred embodiment of the present invention.

Referring to FIG. 5, the burst mode receiver 2000 comprises a filtering unit 110, a variable gain amplifier 120, an A/D converter 140, a first automatic gain control unit 170, a carrier sensing unit 175, a frame synchronizer 200, a second automatic gain control unit 240, an equalizer 260, a channel decoding unit 320, a deframe processor 340, and a multiplier 105.

The filtering unit 110 comprises a band-pass filter 101, a notch filter 114, which is connected between the band-pass filter 101 and the variable gain amplifier 120, an echo canceller 102, an adder 103, and a low pass filter 106, and filters a signal which is input through the telephone line. The first automatic gain control unit 170 is built to share the carrier sensing unit 175 so that both carrier sensing and gain control of the variable gain amplifier 120 are performed.

The burst mode receiver 2000 has a similar structure of the burst mode receiver 1000 shown in FIG. 2, except that the carrier sensing unit 175 is shared by the first automatic gain control unit 170 instead of the STR 103 of FIG. 2 and the notch filter 114 is connected after the band-pass filter 101 instead of the adder 103 of FIG. 2 so that the notch filter 114 is placed in an analog region.

The operation of the burst mode receiver 2000 will now be described. The blocks of FIG. 5 that perform the same operations as in the burst mode receiver 1000 shown in FIG. 2 have the identical reference numbers. Description of these blocks will be omitted. First, the carrier sensing unit 175, which has a structure sharing with the first automatic gain control unit 170, senses a carrier wave from a signal (Received Signal) which is input through the filtering unit 110, roughly detects a burst, and provides the detection result (CS) to the first automatic gain control unit 170, the STR 190, and the frame synchronizer 200.

The first automatic gain control unit 170, in response to the carrier sensing result (CS) detected by the carrier sensing unit 175, adjusts the gain of the variable gain amplifier 120. The first automatic gain control unit 170 estimates a gain for a predetermined window interval, and if the estimation of the gain is completed, enters into a lock state so that the estimated gain is continuously maintained.

The STR 190, in response to the carrier sensing result (CS), estimates the symbol timing of a signal which is input form the filtering unit 110. Here, the frame synchronizer 200, in response to the carrier sensing result (CS), performs frame synchronization of a signal which is output from the STR 190.

An algorithm which is scarcely affected by a gain change is applied to the STR 190 and the frame synchronizer 200 such that the STR 190 and the frame synchronizer 200 independently perform symbol synchronization and frame synchronization, respectively, without being affected by the gain change estimated in the first automatic gain control unit 170.

If the frame synchronization is completed by the frame synchronizer 200, the second automatic gain control unit 240, the equalizer 262, and the carrier recovery circuit 282 begin to operate. The burst mode receiver 2000 performing these operations has the same characteristics of operation timing and operational procedures as the bust mode receiver 1000, though the location of the carrier sensing unit 175 is different.

Figure 6:
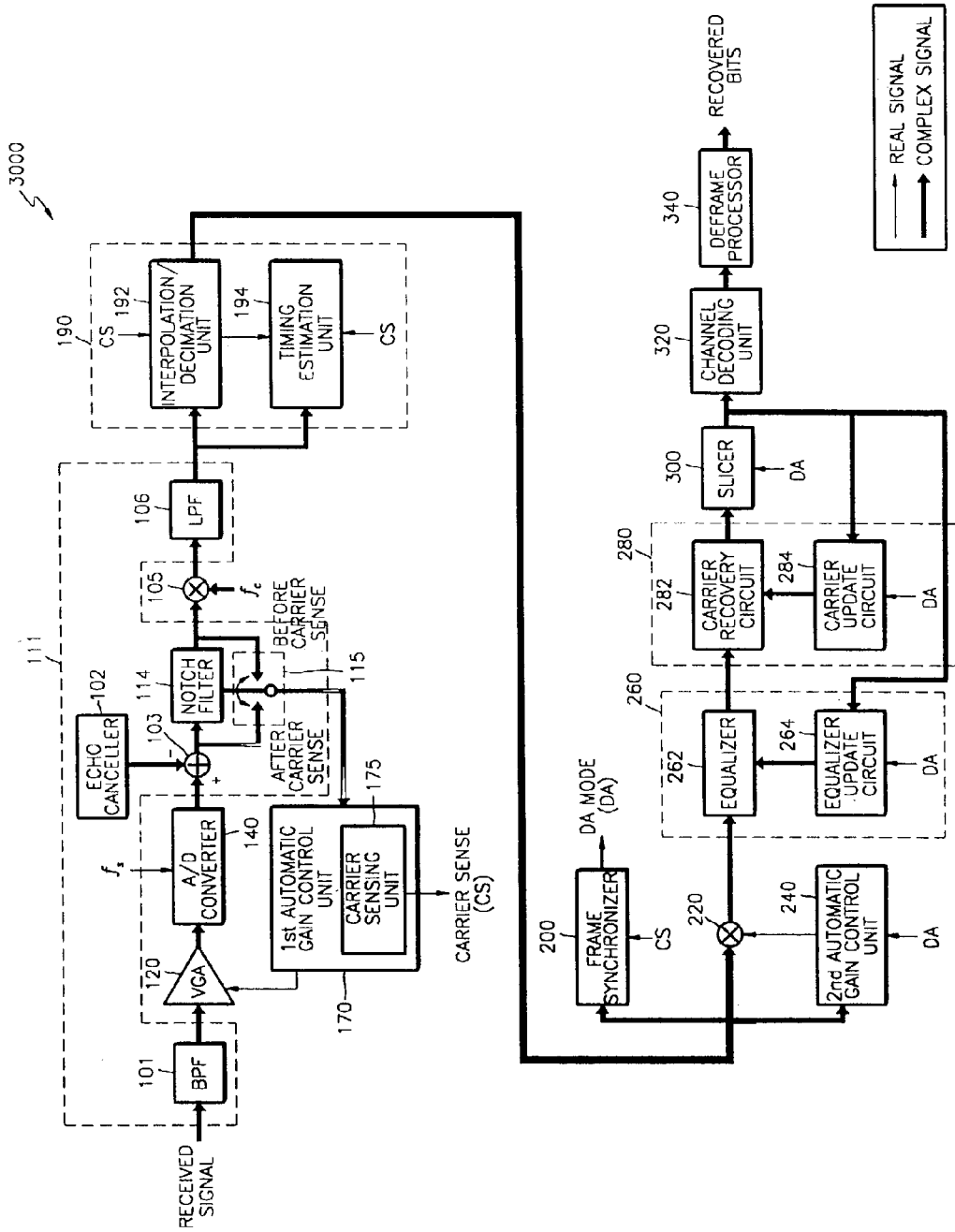
FIG. 6 is a block diagram of a burst mode receiver according to a third preferred embodiment of the present invention.

FIG. 6 is a block diagram of a burst mode receiver 3000 according to a third preferred embodiment of the present invention. In the burst mode receiver 3000 shown in FIG. 6, a notch filter 114 is located in a digital region, that is, after an A/D converter 140, and a carrier sensing unit 175 is shared by the first automatic gain control unit 170.

Referring to FIG. 6, the burst mode receiver 3000 comprises a filtering unit 111, a variable gain amplifier 120, the A/D converter 140, a first automatic gain control unit 170, the carrier sensing unit 175, an STR 190, a frame synchronizer 200, a second automatic gain control unit 240, an equalization unit 260, a slicer 300, a channel decoding unit 320, a deframe processor 340, and a multiplier 105.

The filtering unit 111 comprises a band-pass filter 101, an echo canceller 102, an adder 103, the notch filter 114, which is connected between the adder 103 and the multiplier 105, a switching unit 115, which is connected between the notch filter 114 and the first automatic gain control unit 170, and a low pass filter 106. The filtering unit 111 receives a signal (Received Signal) which is input through the telephone line, and filters the signal.

The carrier sensing unit 175 is shared by the first automatic gain control unit 170 such that both carrier sensing and gain control of the variable gain amplifier 120 are performed.

This structure of the burst mode receiver 3000 is similar to the structure of the burst mode receiver 2000 shown in FIG. 5, except that the notch filter 114 is connected between the adder 103 and the multiplier 105, and a switching unit 115 is added between the input/output terminal of the notch filter 114 and the first automatic gain control unit 170.

The operations performed in the burst mode receiver 3000 will now be described. The blocks of FIG. 6 that perform the same operations as in the burst mode receiver 1000 shown in FIG. 5 have the identical reference numbers. Description of these blocks will be omitted. First, the switching unit 115 provides the output signal of the notch filter 114 to the first automatic gain control unit 170 before carrier sensing is completed (Before Carrier Sense).

The carrier sensing unit 175 receives the output signal of the notch filter 114 through the first automatic gain control unit 170, senses a carrier wave, and outputs the carrier sensing result (CS) to the first automatic gain control unit 170, the STR 190, and the frame synchronizer 200.

The first automatic control unit 170, in response to the output signal of the notch filter 114 and the carrier sensing result (CS), adjusts the gain of the variable gain amplifier 120. If the adjustment of the gain by the first automatic gain control unit 170 is completed, the first automatic gain control unit 170 enters into a lock state such that the estimated gain is continuously maintained.

The switching unit 115 performs a switching operation so that the input signal (that is, the output signal of the adder 103) of the notch filter 114 is output to the first automatic gain control unit 170 after the carrier sensing is completed by the carrier sensing unit 175 (After Carrier Sense)

The STR 190, in response to the carrier sensing result (CS), estimates the symbol timing of a signal which is provided from the filtering unit 11, and the frame synchronizer 200, in response to the carrier sensing result (CS), performs frame synchronization of a signal which is input through the STR 190. Here, an algorithm which is applied to the STR 190 and the frame synchronizer 200 is designed so that the algorithm is not affected by a gain change estimated by the first automatic gain control unit 170.

If the frame synchronization by the frame synchronizer 200 is completed, the second automatic gain control unit 240, the equalizer 262, and the carrier recovery circuit 282 begin to operate.

When compared with the burst mode receiver 2000 shown in FIG. 5, the burst mode receiver 3000 performing these operations has the same characteristics of operation timing and operation procedures as the burst mode receiver shown in FIGS. 3 and 4, as in FIGS. 2 and 5, though the operation of the switching unit 115 is added, and the filtering order of the input signal is different.

If the carrier sensing unit 175 is shared by the STR 190, the notch filter 114 may be placed any location between an analog end and a digital end. However, if the carrier sensing unit 185 is shared by the first automatic gain control unit 170, the notch filter 114 should be placed in an analog end as shown in FIG. 5, or should be placed in a digital end as shown in FIG. 6.

For example, If the notch filters 104 of FIG. 2 and 114 of FIG. 6 are placed at a digital end, the carrier sensing units 185 and 175 should be shared by the STR 180 of FIG. 2 or the first automatic gain control unit 170 of FIG. 6. If the notch filters 104 of FIG. 2 and 114 of FIG. 5 are placed at an analog end or if the notch filter is not used, the carrier sensing unit should be shared by the first automatic gain control unit 170.

As described above, an essential technology which directly determines the performance of a receiver is a synchronization unit algorithm. However, in the burst mode receiving having a preamble structure, the performance of the receiver can be guaranteed only when frame synchronization is guaranteed. Accordingly, the burst mode receiver and the method therefor according to the present invention complete acquisition in a short preamble interval, and detect an accurate burst arrival time so that the stable performance of the burst mode receiver operating in a data-aided method is guaranteed.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A burst mode receiver comprising:
    a filtering unit which filters a signal input through a telephone line;
    a carrier sensing unit which detects a carrier wave from the filtered signal, and roughly detects the location of a burst;
    a symbol timing recovery unit which, in response to the carrier sensing result, finely recovers symbol timing of the signal;
    a frame synchronizer which, in response to the carrier sensing result, performs frame synchronization of the signal;
    a gain control unit which, in response to the carrier sensing result, performs a first gain control, and, in response to the result of the frame synchronization, performs a second gain control;
    an equalization unit which, in response to the result of the frame synchronization, equalizes the signal; and
    a carrier recovery unit which, in response to the result of the frame synchronization, recovers the carrier wave of the signal.

2. The burst mode receiver of claim 1, further comprising:
    a variable gain amplifier which is connected between the filtering unit and the gain control unit, and amplifies the signal by the same amount as the gain determined in the gain control unit; and
    an analog-to-digital (A/D) converter which converts an analog-type output signal of the variable gain amplifier into a digital signal and provides the digital signal to the filtering unit.

3. The burst mode receiver of claim 2, wherein if a notch filter is used in filtering a digital signal, the carrier sensing unit is shared by one of the symbol timing recovery unit and the gain control unit.

4. The burst mode receiver of claim 2, wherein if a notch filter is used in filtering an analog signal, the carrier sensing unit is shared by one of the symbol timing recovery unit and the gain control unit.

5. The burst mode receiver of claim 2, wherein the gain control unit comprises:
    a first gain controller which, in response to the carrier sensing result, adjusts the gain of the variable gain amplifier; and
    a second gain controller which, in response to the frame synchronization result, adjusts a gain by which the result of the symbol timing recovery will be multiplied.

6. The burst mode receiver of claim 5, wherein the first gain controller is formed as a feedback type, and calculates the gain of the variable gain amplifier from a signal which is input for a predetermined interval before the frame synchronization, and after the end of the interval the calculated gain is continuously maintained.

7. The burst mode receiver of claim 5, wherein the second gain controller is formed as a feedforward type, and calculates the gain of the variable gain amplifier from a signal which is input for a predetermined interval before the frame synchronization, and from the end of the interval the calculated gain is continuously maintained.

8. The burst mode receiver of claim 1, wherein the filtering unit comprises a notch filter which notch filters the input signal.

9. The burst mode receiver of claim 8, wherein if the notch filter is used in filtering a digital signal, the carrier sensing unit is shared by one of the symbol timing recovery unit and the gain control unit.

10. The burst mode receiver of claim 8, wherein if the notch filter is used in filtering an analog signal, the carrier sensing unit is shared by one of the symbol timing recovery unit and the gain control unit.

11. The burst mode receiver of claim 8, wherein if the filtering unit does not have a notch filter, the carrier sensing unit is shared by one of the symbol timing recovery unit and the gain control unit.

12. The burst mode receiver of claim 1, wherein the symbol timing recovery unit and the frame synchronizer are not affected by the gain determined in the gain control unit.

13. The burst mode receiver of claim 1, wherein the equalization unit is formed by a decision feedback equalizer.

14. The burst mode receiver of claim 1, wherein the carrier recovery circuit is a feedback carrier phase recovery circuit.

15. The burst mode receiver of claim 1, wherein the input signal is formed with at least one or more packets that are transmitted from at least one or more transmitters complying with a burst mode protocol, and each of the packets has a preamble region containing information indicating the nature of the packet, and a payload region containing actual data.

16. The burst mode receiver of claim 15, wherein the gain control unit, the symbol timing recovery unit, the frame synchronizer, the equalization unit, and the carrier recovery unit complete initial synchronization within the preamble interval, and after the preamble interval, enter into a normal state.

17. The burst mode receiver of claim 1, further comprising:
a slicer which, in response to the frame synchronization result and the carrier recovery result, determines a symbol.

18. The burst mode receiver of claim 17, further comprising:
an update unit which, in response to the output of the slicer, updates coefficients used in the equalization and the carrier synchronization.

19. A burst mode receiver comprising:
a filtering unit which receives an analog signal input through a telephone line and filters the signal;
a variable gain amplifier which amplifies the input signal in a predetermined ratio;
an A/D converter which converts the amplified signal into a digital signal;
a carrier sensing/symbol timing recovery unit which detects a carrier wave from the filtered signal, and in response to the carrier detection result recovers symbol timing;
a first gain controller which, in response to the carrier sensing result, adjusts the gain of the variable gain amplifier;
a frame synchronizer which, in response to the carrier sensing result, performs frame synchronization;
a second gain controller which if the frame synchronization is completed, in response to the frame synchronization result, adjusts a gain by which the symbol timing recovery result will be multiplied;
an equalization unit which, in response to the frame synchronization result, equalizes a signal obtained by multiplying the symbol timing recovery result by the gain; and
a carrier recovery unit which, in response to the frame synchronization result, recovers a carrier wave from the equalized signal.

20. The burst mode receiver of claim 19, wherein the filtering unit comprises:
a band-pass filter which receives the analog signal, and provides a signal included in a predetermined frequency band to the variable gain amplifier;
an echo canceller which generates an echo duplication signal;
an adder which subtracts the echo duplication signal from a digital output signal of the variable gain amplifier which is input through the A/D converter, and provides the subtraction result to the first gain control unit;
a notch filter which, in response to the subtraction result of the adder, cuts off a signal included in a narrow band frequency region;
a multiplier which multiplies the output signal of the notch filter by a predetermined carrier frequency; and
a low pass filter which smoothes the output signal of the multiplier, and outputs the smoothed signal to the carrier sensing/symbol timing recovery unit.

21. The burst mode receiver of claim 19, wherein the first gain controller is formed as a feedback type, and calculates the gain of the variable gain amplifier from a signal which is input for a predetermined interval before the frame synchronization, and after the end of the interval the calculated gain is continuously maintained.

22. The burst mode receiver of claim 19, wherein the second gain controller is formed as a feedforward type, and calculates the gain of the variable gain amplifier from a signal which is input for a predetermined interval before the frame synchronization, and from the end of the interval the calculated gain is continuously maintained.

23. The burst mode receiver of claim 19, wherein the symbol timing recovery unit and the frame synchronizer are not affected by the gain determined in the first gain control unit.

24. The burst mode receiver of claim 19, wherein the equalization unit is formed by a decision feedback equalizer.

25. The burst mode receiver of claim 19, wherein the carrier recovery circuit is a feedback carrier phase recovery circuit.

26. The burst mode receiver of claim 19, wherein the input signal is formed with at least one or more packets that are transmitted from at least one or more transmitters complying with a burst mode protocol, and each of the packets has a preamble region containing information indicating the nature of the packet, and a payload region containing actual data.

27. The burst mode receiver of claim 26, wherein the first and second gain controller, the carrier sensing/symbol timing recovery unit, the frame synchronizer, the equalization unit, and the carrier recovery circuit complete initial synchronization within the preamble interval, and after the preamble interval, enter into a normal state.

28. The burst mode receiver of claim 19, further comprising:
a slicer which, in response to the frame synchronization result and the carrier recovery result, determines a symbol.

29. The burst mode receiver of claim 28, further comprising:
an update unit which, in response to the output of the slicer, updates coefficients used in the equalization and the carrier synchronization.

30. A burst mode receiver comprising:
a filtering unit which receives an analog signal input through a telephone line and filters the signal;
a variable gain amplifier which amplifies the input signal in a predetermined ratio;
an A/D converter which converts the amplified signal into a digital signal;
a carrier detection/gain control unit which detects a carrier wave from the filtered signal, and in response to the carrier detection result controls the gain of the variable gain amplifier;
a symbol timing recovery unit which, in response to the carrier detection result, recover the symbol timing of the filtered signal;
a frame synchronizer which, in response to the carrier sensing result, performs frame synchronization;
a gain control unit which if the frame synchronization is completed, in response to the frame synchronization result, adjusts a gain by which the symbol timing recovery result will be multiplied;
an equalization unit which, in response to the frame synchronization result, equalizes a signal obtained by multiplying the symbol timing recovery result by the gain; and
a carrier recovery unit which, in response to the frame synchronization result, recovers a carrier wave from the equalized signal.

31. The burst mode receiver of claim 30, wherein the filtering unit comprises:
a band-pass filter which receives the analog signal, and outputs a signal included in a predetermined frequency band;

a notch filter which cuts off a signal included in a narrow-scope frequency region in the band-pass filtered signal, and outputs the result to the variable gain amplifier;

an echo canceller which generates an echo duplication signal;

an adder which subtracts the echo duplication signal from a digital output signal of the variable gain amplifier which is input through the A/D converter, and provides the subtraction result to the carrier detection/gain control unit;

a multiplier which multiplies the subtraction result of the adder by a predetermined carrier frequency; and a low pass filter which smoothes the output signal of the multiplier, and outputs the smoothed signal to the symbol timing recovery unit.

32. The burst mode receiver of claim 30, wherein the filtering unit comprises:

a band-pass filter which receives the analog signal, and outputs a signal included in a predetermined frequency band to the variable gain amplifier;

an echo canceller which generates an echo duplication signal;

an adder which subtracts the echo duplication signal from a digital output signal of the variable gain amplifier which is input through the A/D converter, and provides the subtraction result to the carrier detection/gain control unit;

a notch filter which, in response to the subtraction result of the adder, cuts off a signal included in a narrow-scope frequency region;

a multiplier which multiplies the output signal of the notch filter by a predetermined carrier frequency;

a switching unit which is connected to the input/output terminal of the notch filter and the carrier detection/gain control unit, and before the carrier detection/gain control unit completes carrier detection, provides the output signal of the notch filter to the carrier detection/gain control unit, and after the carrier detection/gain control unit completes carrier detection, provides the input signal of the notch filter to the carrier detection/gain control unit; and a low pass filter which smoothes the output signal of the multiplier, and outputs the smoothed signal to carrier detection/symbol timing recovery unit.

33. The burst mode receiver of claim 30, wherein the carrier detection/gain control unit and the gain control unit calculate the gain of the variable gain amplifier from a signal which is input for a predetermined interval, and after the end of the interval the calculated gain is continuously maintained.

34. The burst mode receiver of claim 30, wherein the symbol timing recovery unit and the frame synchronizer are not affected by the gain determined in the carrier detection/gain control unit.

35. The burst mode receiver of claim 30, wherein the equalization unit is formed by a decision feedback equalizer.

36. The burst mode receiver of claim 30, wherein the carrier recovery circuit is a feedback carrier phase recovery circuit.

37. The burst mode receiver of claim 30, wherein the input signal is formed with at least one or more packets that are transmitted from at least one or more transmitters complying with a burst mode protocol, and each of the packets has a preamble region containing information indicating the nature of the packet, and a payload region containing actual data.

38. The burst mode receiver of claim 37, wherein the carrier detection/gain control unit, the gain control unit, the symbol timing recovery unit, the frame synchronizer, the equalization unit and the carrier recovery circuit complete initial synchronization within the preamble interval, and after the preamble interval, enter into a normal state.

39. The burst mode receiver of claim 30, further comprising:

a slicer which, in response to the frame synchronization result and the carrier recovery result, determines a symbol.

40. The burst mode receiver of claim 38, further comprising:

an update unit which, in response to the output of the slicer, updates coefficients used in the equalization and the carrier synchronization.

41. A burst mode receiving method comprising:

receiving a signal from a transmitter complying with a burst mode protocol;

filtering the received signal;

sensing a carrier wave from the filtered signal, detecting a rough location of a burst and outputting a carrier sensing result;

in response to the carrier sensing result, performing coarse gain control, symbol timing recovery, and frame synchronization; and if the frame synchronization is completed, in response to the frame synchronization, performing fine gain control, equalization of the signal, and carrier recovery.

42. The burst mode receiving method of claim 41, further comprising:

improving the accuracy of symbol determination by updating variables used in the equalization and carrier recovery operations.

* * * * *